(12) United States Patent
Sah et al.

(10) Patent No.: US 7,568,990 B2
(45) Date of Patent: Aug. 4, 2009

(54) METHOD AND APPARATUS TO CONTROL OPERATION OF A HYDRAULIC CONTROL CIRCUIT FOR AN ELECTRO-MECHANICAL TRANSMISSION

(75) Inventors: Jy-Jen F. Sah, West Bloomfield, MI (US); Ali Naqvi, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 379 days.

(21) Appl. No.: 11/462,654

(22) Filed: Aug. 4, 2006

(65) Prior Publication Data

US 2008/0182696 A1    Jul. 31, 2008

(51) Int. Cl.
*F16H 31/00* (2006.01)
(52) U.S. Cl. .............................. 475/117; 475/5; 475/125; 475/128; 180/65.2
(58) Field of Classification Search .................. 477/3, 477/5, 6, 97, 98, 906, 907; 475/5, 116, 117, 475/125, 127, 128; 180/65.2, 65.4, 65.7
See application file for complete search history.

(56) References Cited

U.S. PATENT DOCUMENTS

| | | | | |
|---|---|---|---|---|
| 6,026,921 | A * | 2/2000 | Aoyama et al. | 180/65.2 |
| 6,692,402 | B2 * | 2/2004 | Nakamori et al. | 477/3 |
| 6,709,362 | B2 * | 3/2004 | Tomohiro et al. | 477/3 |
| 2005/0080527 | A1 * | 4/2005 | Tao et al. | 701/34 |

* cited by examiner

*Primary Examiner*—David D. Le

(57) ABSTRACT

There is provided a control system for electro-mechanical transmission that is selectively operative in a plurality of fixed gear modes and continuously variable modes comprising first and second electrical machines and four hydraulically-actuated clutches in fluid communication with a hydraulic circuit comprising first, second and third pressure control devices and first and second flow management valves. The control system is operative to selectively actuate the pressure control devices and the flow management valves based upon a demand for torque, presence of a fault, and temperatures of the electric machines.

27 Claims, 5 Drawing Sheets

METHOD AND APPARATUS TO CONTROL OPERATION OF A HYDRAULIC CONTROL CIRCUIT FOR AN ELECTRO-MECHANICAL TRANSMISSION

TECHNICAL FIELD

This invention pertains generally to control systems for electro-mechanical transmissions, and more specifically to control of a hydraulic circuit.

BACKGROUND OF THE INVENTION

Powertrain architectures comprise torque-generative devices, including internal combustion engines and electric machines, which transmit torque through a transmission device to a vehicle driveline. One such transmission includes a two-mode, compound-split, electro-mechanical transmission which utilizes an input member for receiving motive torque from a prime mover power source, typically an internal combustion engine, and an output member for delivering motive torque from the transmission to the vehicle driveline. Electrical machines, operatively connected to an electrical energy storage device, comprise motor/generators operable to generate motive torque for input to the transmission, independently of torque input from the internal combustion engine. The electrical machines are further operable to transform vehicle kinetic energy, transmitted through the vehicle driveline, to electrical energy potential that is storable in the electrical energy storage device. A control system monitors various inputs from the vehicle and the operator and provides operational control of the powertrain system, including controlling transmission gear shifting, controlling the torque-generative devices, and regulating the electrical power interchange between the electrical energy storage device and the electrical machines.

The exemplary electro-mechanical transmissions are selectively operative in fixed gear modes and continuously variable modes through actuation of the torque-transfer clutches, typically employing a hydraulic circuit to effect clutch actuation. A fixed gear mode occurs when rotational speed of the transmission output member is a fixed ratio of rotational speed of the input member from the engine, typically due to actuation of one or more torque-transfer clutches. A continuously variable mode occurs when rotational speed of the transmission output member is variable based upon operating speeds of one or more electrical machines. The electrical machines can be connected to the output shaft via actuation of a clutch, or by direct connection. Clutch actuation and deactivation is typically effected through a hydraulic circuit.

Engineers implementing powertrain systems having electro-mechanical transmissions with hydraulically-actuated clutches are tasked with implementing transmission control schemes to effectively actuate torque-transfer clutches while providing fault detection and limp-home capability. Such a system is described hereinafter.

SUMMARY OF THE INVENTION

In order to address the concerns raised hereinabove and in accordance with an embodiment of the invention, a control system for electro-mechanical transmission, is provided that is selectively operative in a plurality of fixed gear modes and continuously variable modes comprising first and second electrical machines and four hydraulically-actuated clutches in fluid communication with a hydraulic circuit comprising first, second and third pressure control devices and first and second flow management valves. The control system is operative to selectively actuate the pressure control devices and the flow management valves based upon a demand for torque, presence of a fault, and temperatures of the electric machines.

An aspect of the invention includes a transmission, comprising: an electro-mechanical device operative to transmit torque. The transmission comprises first and second electrical machines, a plurality of planetary gears and four hydraulically actuated torque-transfer devices selectively actuatable using a hydraulic circuit. The hydraulic circuit comprises first, second and third pressure control devices and first, and second flow management valves and pressure monitoring devices. There is included a control system adapted to monitor the pressure monitoring devices to identify presence of a fault and adapted to determine a demand for torque and temperatures of the electrical machines. The control system is adapted to execute a computer program to selectively actuate the four torque-transfer devices by selectively actuating the plurality of pressure control devices and flow management valves based upon the demand for torque, the presence of a fault; and the temperatures of the electrical machines, These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
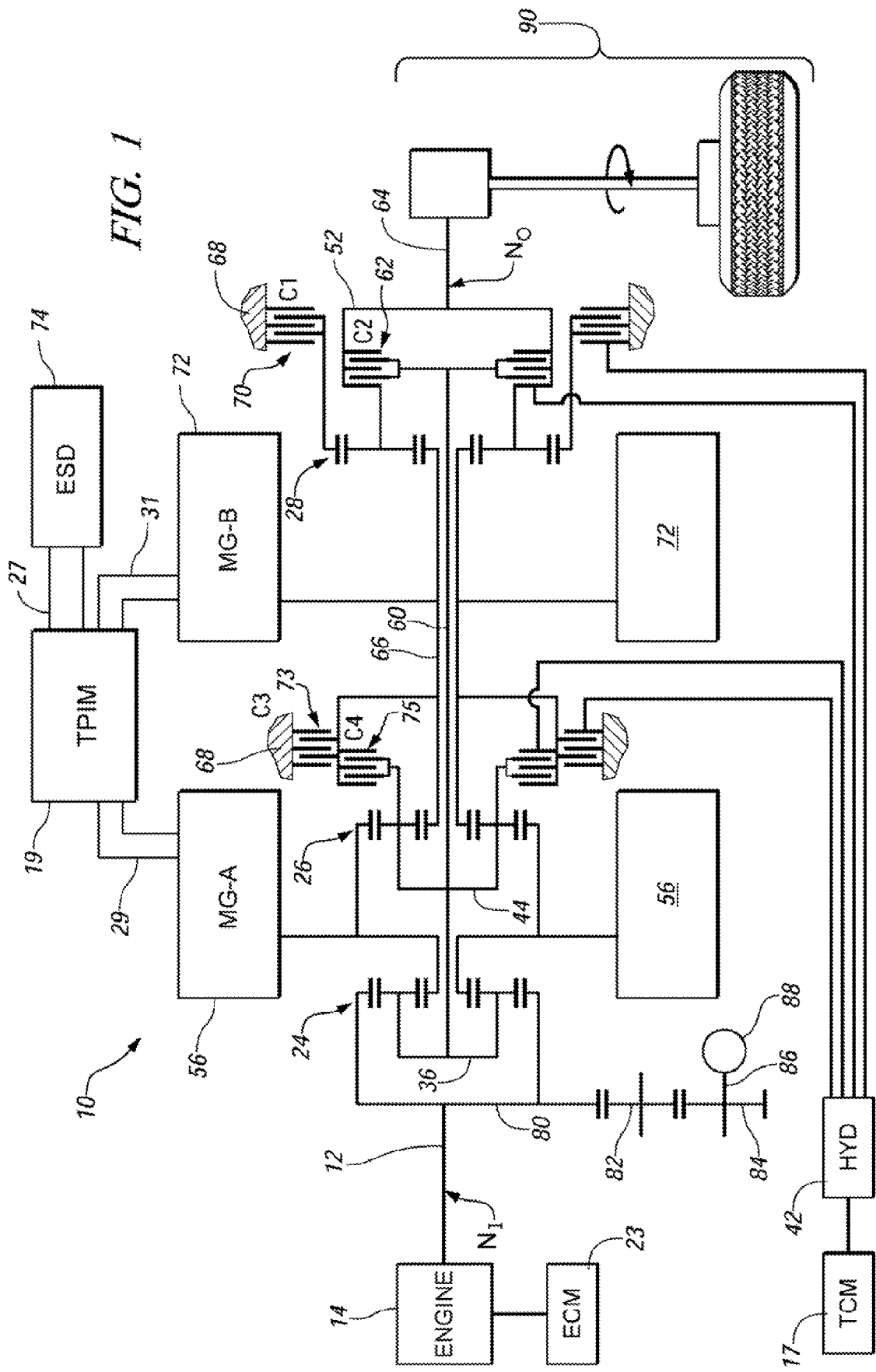
FIG. 1 is a schematic diagram of an exemplary powertrain, in accordance with the present invention.
Figure 2:
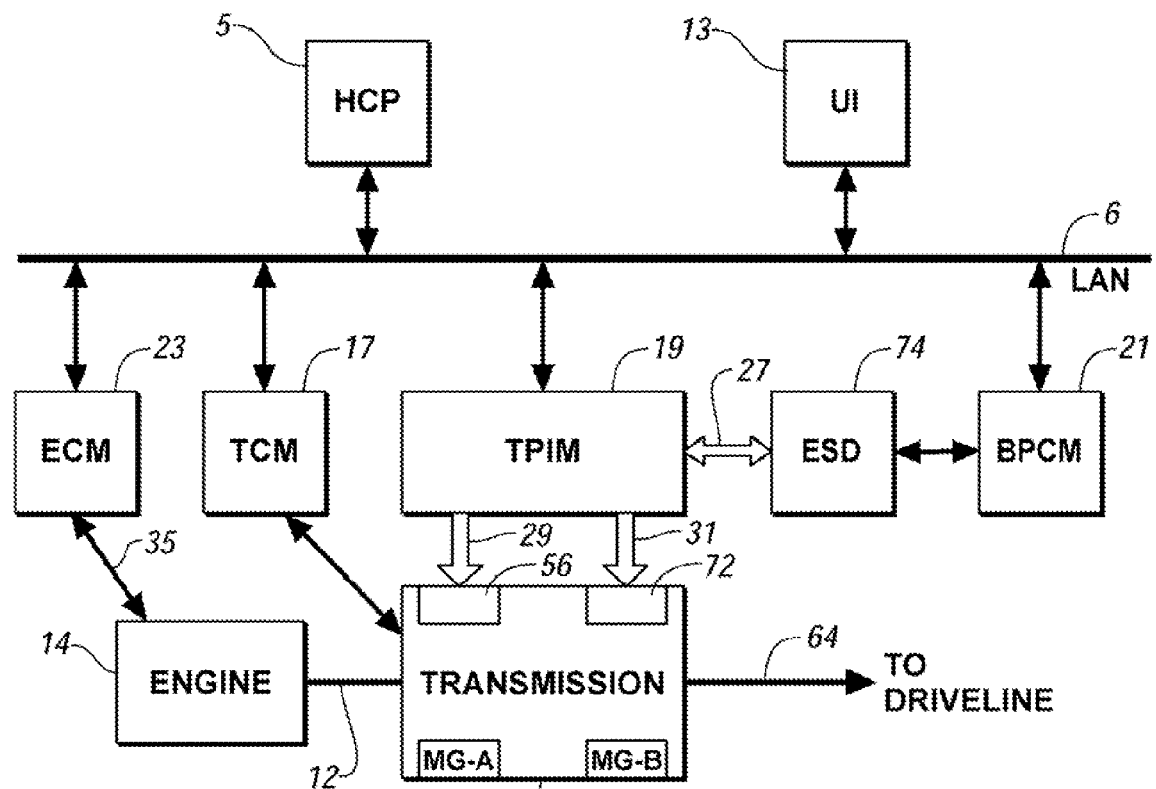
FIG. 2 is a schematic diagram of an exemplary architecture for a control system and powertrain, in accordance with the present invention.

Referring now to the drawings, wherein the showings are for the purpose of illustrating the invention only and not for the purpose of limiting the same. FIGS. 1 and 2 depict a system comprising an engine 14, transmission 10, control system, and driveline which has been constructed in accordance with an embodiment of the present invention.

Mechanical aspects of exemplary transmission 10 are disclosed in detail in commonly assigned U.S. Pat. No. 6,953,409, entitled "Two-Mode, Compound-Split, Hybrid Electro-Mechanical Transmission having Four Fixed Ratios", which is incorporated herein by reference. The exemplary two-mode, compound-split, electro-mechanical hybrid transmission embodying the concepts of the present invention is depicted in FIG. 1, and is designated generally by the numeral 10. The transmission 10 has an input shaft 12 that is preferably directly driven by an internal combustion engine 14. The transmission 10 utilizes three planetary-gear sets 24, 26 and 28, and four torque-transmitting devices, i.e. clutches C1 70, C2 62, C3 73, and C4 75. An electro-hydraulic control system 42, preferably controlled by transmission control module 17, is operative to control actuation and deactivation of the clutches. Clutches C2 and C4 preferably comprise hydraulically-actuated rotating friction clutches. Clutches C1 and C3 preferably comprise comprising hydraulically-actuated stationary devices grounded to the transmission case 68.

The three gear sets 24, 26 and 28 each comprise simple planetary gear sets. Furthermore, the first and second planetary gear sets 24 and 26 are compounded in that the inner gear member of the first planetary gear set 24 is conjoined to an outer gear member of the second planetary gear set 26, and connected to a first electrical machine comprising a motor/generator 56, also referred to as "MG-A".

The planetary gear sets 24 and 26 are further compounded in that carrier 36 of the first planetary gear set 24 is conjoined through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, through clutch C2 62. The carrier 52 of the third planetary gear set 28 is connected directly to the transmission output member 64. An inner gear member of the second planetary gear set 26 is connected to an inner gear member of the third planetary gear set 28 through a sleeve shaft 66 that circumscribes shaft 60, and is connected to a second electrical machine comprising a motor/generator 72, referred to as MG-B.

All the planetary gear sets 24, 26 and 28 as well as MG-A and MG-B 56 and 72 are coaxially oriented, as about the axially disposed shaft 60. MG-A and MG-B 56 and 72 are both of an annular configuration which permits them to circumscribe the three planetary gear sets 24, 26 and 28 such that the planetary gear sets 24, 26 and 28 are disposed radially inwardly of the MG-A and MG-B 56 and 72. Transmission output member 64 is operably connected to a vehicle driveline 90 to provide motive torque. Each clutch is preferably hydraulically actuated, receiving pressurized hydraulic fluid from a pump, described below, via an electro-hydraulic control circuit 42 described hereinbelow with reference to FIG. 3.

The transmission 10 receives input motive torque from the torque-generative devices, including the engine 14 and the MG-A 56 and MG-B 72, as a result of energy conversion from fuel or electrical potential stored in an electrical energy storage device (ESD) 74. The ESD 74 typically comprises one or more batteries. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage De-coupled to transmission power inverter module (TPIM) 19 via DC transfer conductors 27. The TPIM 19 is an element of the control system described hereinafter with regard to FIG. 2. The TPIM 19 transmits electrical energy to and from MG-A 56 by transfer conductors 29, and the TPIM 19 similarly transmits electrical energy to and from MG-B 72 by transfer conductors 31. Electrical current is transmitted to and from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality.

In motoring control, the respective inverter receives current from the DC transmission lines and provides AC current to the respective electrical machine, i.e. MG-A and MG-B, over transfer conductors 29 and 31. In regeneration control, the respective inverter receives AC current from the electrical machine over transfer conductors 29 and 31 and transmits current to the DC lines 27. The net DC current provided to or from the inverters determines the charge or discharge operating mode of the electrical energy storage device 74. Preferably, MG-A 56 and MG-B 72 are three-phase AC machines each having a rotor operable to rotate within a stator that is mounted on a case of the transmission. The inverters comprise known complementary three-phase power electronics devices.

Referring now to FIG. 2, a schematic block diagram of the control system, comprising a distributed control module architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, divisibility, and protection of hardware, including batteries of ESD 74 and MG-A and MG-B 56, 72. The distributed control module architecture includes engine control module ('ECM') 23, transmission control module ('TCM') 17, battery pack control module ('BPCM') 21, and Transmission Power Inverter Module ('TPIM') 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain including the transmission 10 through a request for a torque output. Exemplary vehicle operator inputs to the UI 13 include an accelerator pedal, a brake pedal, transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules. The specific communication protocol utilized is application-specific. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: an operator torque request, an engine torque command, clutch torque commands for the various clutches C1, C2, C3, C4 of the transmission 10; and motor torque commands for MG-A and MG-B. The TCM is operatively connected to the electro-hydraulic control circuit 42 of FIG. 3, including monitoring various pressure sensing devices (not shown) and generating and executing control signals for various solenoids to control pressure switches and control valves contained therein.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command from the HCP 5, and generates a desired axle torque, and an indication of actual engine torque input to the transmission, which is communicated to the HCP 5. For simplicity, ECM 23 is shown generally having bi-directional interface with engine 14 via aggregate line 35. Various other parameters that may be sensed by ECM 23 include engine coolant temperature, engine input speed, $N_I$, to shaft 12 leading to the transmission, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques for each of the clutches C1, C2, C3, and, C4 and rotational speed, $N_O$, of the output shaft 64. Other actuators and sensors may be used to provide additional information from the TCM to the HCP for control purposes. The TCM 17 monitors inputs from pressure switches and selectively actuates pressure control solenoids and shift solenoids to actuate various clutches to achieve various transmission operating modes, as described hereinbelow.

The BPCM 21 is signally connected one or more sensors operable to monitor electrical current or voltage parameters of the ESD 74 to provide information about the state of the batteries to the HCP 5. Such information includes battery state-of-charge, battery voltage and available battery power.

The TPIM 19 includes previously referenced power inverters and motor control modules configured to receive motor control commands and control inverter states therefrom to provide motor drive or regeneration functionality. The TPIM 19 is operable to generate torque commands for MG-A 56 and MG-B 72, based upon input from the HCP 5, which is driven by operator input through UI 13 and system operating parameters. The motor torque commands for MG-A and MG-B are implemented by the control system, including the TPIM 19, to control MG-A and MG-B. Individual motor speed signals for MG-A and MG-B are derived by the TPIM 19 from the motor phase information or conventional rotation sensors. The TPIM 19 determines and communicates motor speeds to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged.

Each of the aforementioned control modules is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

In response to an operator's action, as captured by the UI 13, the supervisory HCP control module 5 and one or more of the other control modules determine requested output torque at shaft 64, also referred to as the operator torque request. Selectively operated components of the transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines an output torque which affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output, speeds from slow to fast in order to meet the operator demand.

The exemplary two-mode, compound-split, electro-mechanical transmission, operates in several fixed gear operating modes and continuously variable operating modes, described with reference to FIG. 1, and Table 1, below.

TABLE 1

| Transmission Operating Mode | Actuated Clutches | |
|---|---|---|
| Mode I | C1 70 | |
| Fixed Ratio (GR1) | C1 70 | C4 75 |
| Fixed Ratio (GR2) | C1 70 | C2 62 |
| Mode II | C2 62 | |
| Fixed Ratio (GR3) | C2 62 | C4 75 |
| Fixed Ratio (GR4) | C2 62 | C3 73 |

The various transmission operating modes described in the table indicate which of the specific clutches C1, C2, C3, and C4 are engaged or actuated for each operating mode. Additionally, in various transmission operating modes, MG-A and MG-B may each operate as electrical motors to generate motive torque, or as a generator to generate electrical energy. A first mode, or gear train, is selected when clutch C1 70 is actuated in order to "ground" the outer gear member of the third planetary gear set 28. A second mode, or gear train, is selected when clutch C1 70 is released and clutch C2 62 is simultaneously actuated to connect the shaft 60 to the carrier of the third planetary gear set 28. Other factors outside the scope of the invention affect when the electrical machines 56, 72 operate as motors and generators, and are not discussed herein.

The control system, shown primarily in FIG. 2, is operable to provide a range of transmission output speeds at shaft 64 from relatively slow to relatively fast within each mode of operation. The combination of two modes with a slow-to-fast output speed range in each mode allows the transmission 10 to propel a vehicle from a stationary condition to highway speeds, and meet various other requirements as previously described. Additionally, the control system coordinates operation of the transmission 10 so as to allow synchronized shifts between the modes.

The first and second modes of operation refer to circumstances in which the transmission functions are controlled by one clutch, i.e. either clutch C1 62 or C2 70, and by the controlled speed and torque of the electrical machines 56 and 72, which can be referred to as a continuously variable transmission mode. Certain ranges of operation are described below in which fixed ratios are achieved by applying an additional clutch. This additional clutch may be clutch C3 73 or C4 75, as shown in the table, above, When the additional clutch is applied, fixed ratio operation of input-to-output speed of the transmission, i.e. $N_I/N_O$, is achieved. The rotations of machines MG-A and MG-B 56, 72 are dependent on internal rotation of the mechanism as defined by the clutching and proportional to the input speed measured at shaft 12. The machines MG-A and MG-B function as motors or generators. They are completely independent of engine to output power flow, thereby enabling both to be motors, both to function as generators, or any combination thereof. This allows, for instance, during operation in Fixed Ratio 1 that motive power output from the transmission at shaft 64 is provided by power from the engine and power from MG-A and MG-B, through planetary gear set 28 by accepting power from ESD 74.

Figure 3:
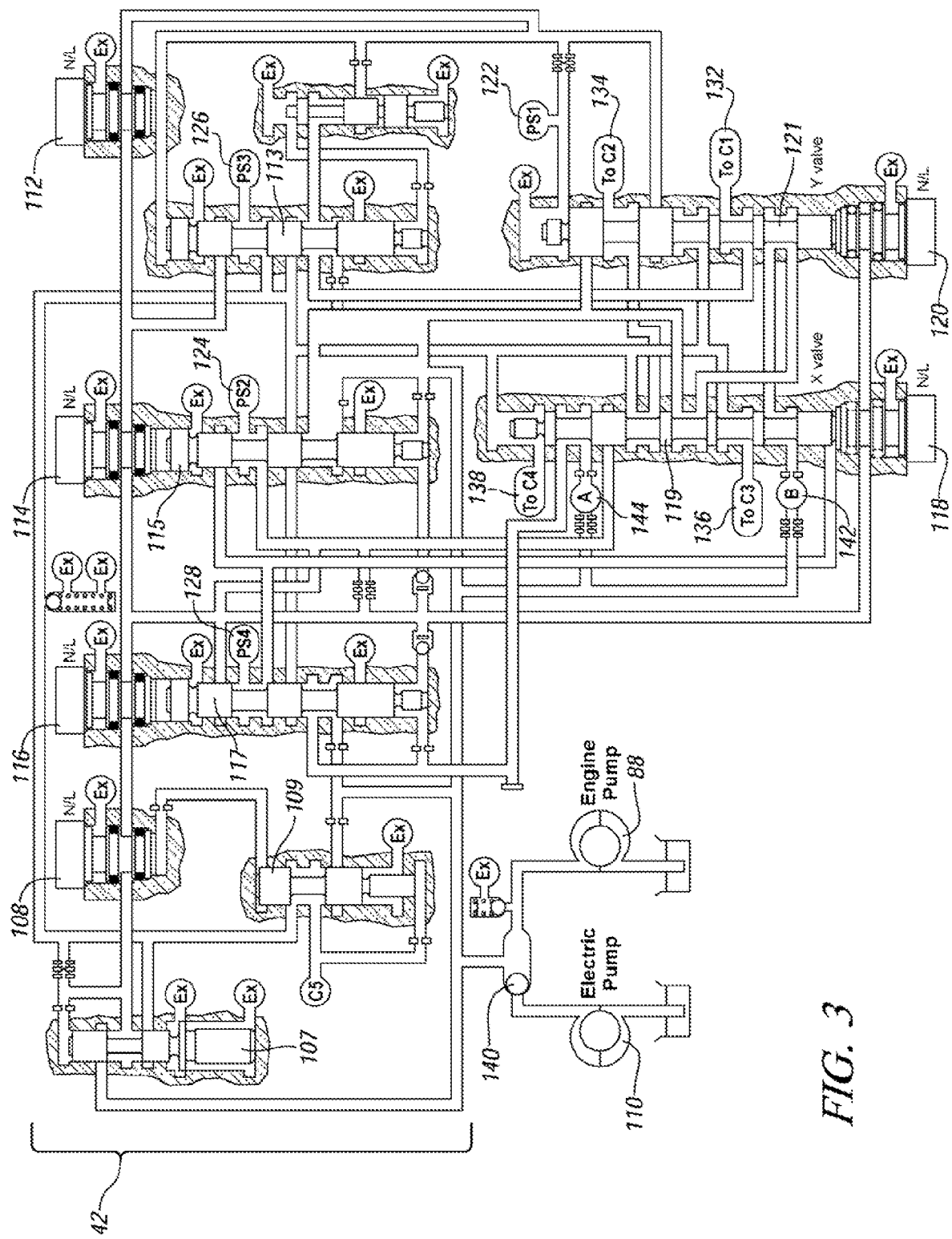
FIG. 3 is a schematic diagram of a hydraulic circuit, in accordance with the present invention.

Referring to FIG. 3, a schematic diagram is shown which provides a more detailed description of the exemplary electro-hydraulic system for controlling flow of hydraulic fluid in the exemplary transmission, including operation of main hydraulic pump 88 and an auxiliary hydraulic pump 110. As previously described with reference to FIG. 1, the main hydraulic pump 88 is driven off the input shaft from the engine 10. The main hydraulic pump 88 receives input torque from the engine and pumps hydraulic fluid drawn from a sump into hydraulic circuit 42 of the transmission, initially passing through control valve 140. Auxiliary pump 110 is operatively electrically controlled by the TPIM 19. The auxiliary pump 110 preferably comprises an electrically-powered pump of an appropriate size and capacity to provide sufficient flow of pressurized hydraulic fluid into the hydraulic system when operational. Pressurized hydraulic fluid flows into electro-hydraulic control circuit 42, which is operable to selectively distribute hydraulic pressure to a series of devices, including the torque-transfer clutches C1 70, C2 62, C3 73, and C4 75, cooling circuits for machines A and B, and a circuit for cooling and lubricating the transmission 10 (not shown). As previously stated, the TCM 17 is preferably operable to actuate the various clutches to achieve various transmission operating modes through selective actuation of pressure control solenoids PCS_1 108, PCS_2 112, PCS_3 114, PCS_4 116 and solenoid-controlled flow management valves X-valve 118 and Y-valve 120. The circuit is fluidly connected to pressure switches PS_1, PS_2, PS_3, and PS_4 via passages 122, 124, 126, and 128, respectively. The pressure control solenoid PCS_1 108 has control positions of neutral and high and is operative to provide modulation of fluidic pressure and flow in the hydraulic circuit through fluidic interaction with valve 107. Pressure control solenoid PCS_2 112 has control positions of neutral and low, and is fluidly connected to spool valve 113 and operative to effect flow therethrough when actuated. Spool valve 113 is fluidly connected to pressure switch PS_3 via passage 126. Pressure control solenoid PCS_3 114 has control positions of neutral and high, and is fluidly connected to spool valve 115 and operative to effect flow therethrough when actuated. Spool valve 115 is fluidly connected to pressure switch PS_2 via passage 124. Pressure control solenoid PCS_4 116 has control positions of neutral and low, and is fluidly connected to spool valve 117 and operative to effect flow therethrough when actuated. Spool valve 117 is fluidly connected to pressure switch PS_4 via passage 128.

The X-Valve 119 and Y-Valve 121 each comprise flow management valves controlled by solenoids 118, 120, respectively, in the exemplary system, and have control states of High ('1') and Low ('0'). The control states reference positions of each valve effecting flow control to different elements in the hydraulic circuit 42 and the transmission 10. The X-valve 119 is operable to direct pressurized fluid to clutches C3 and C4 and cooling systems for stators of MG-A and MG-B via fluidic passages 136, 138, 140, 142 respectively, depending upon the source of the fluidic input, as is described hereinafter. The Y-valve 121 is operable to direct pressurized fluid to clutches C1 and C2 via fluidic passages 132 and 134 respectively, depending upon the source of the fluidic input, as is described hereinafter. A more detailed description of the exemplary electro-hydraulic control circuit 42 is provided in commonly assigned U.S. patent application Ser. No. 11/263,216, entitled "A Multiplexed Pressure Switch System for an Electrically Variable Hybrid Transmission", which is incorporated herein by reference.

An exemplary logic table to accomplish control of the exemplary electro-hydraulic control circuit 42 is provided with reference to Table 2, below.

TABLE 2

| Operating State | X-Valve Logic No Latch | Y-Valve Logic C2 Latch | PCS_1 Neutral/ High | PCS_2 Neutral/ High | PCS_3 Neutral/ High | PCS_4 Neutral/ Low |
|---|---|---|---|---|---|---|
| EVT Mode I | 0 | 0 | Line Modulation | MG_B Stator Cool | C1 | MG_A Stator Cool |
| EVT Mode II | 0 | 1 | Line Modulation | C2 | MG_B Stator Cool | MG_A Stator Cool |
| Low Range | 1 | 0 | Line Modulation | C2 | C1 | C4 |
| High Range | 1 | 1 | Line Modulation | C2 | C3 | C4 |

Selective control of the X and Y valves and actuation of the solenoids PCS_2, PCS_3, and PCS_4 facilitate flow of hydraulic fluid to actuate clutches C1, C2, C3, and C4, and provide cooling for the stators of MG-A and MG-B.

In operation, an operating mode, i.e. one of the fixed gear and continuously variable mode operations, is determined for the exemplary transmission based upon a variety of operating characteristics of the powertrain. This includes demand for an operator demand for torque, typically communicated through inputs to the UI 13 as previously described. Additionally, a demand for output torque is predicated on external conditions, including, e.g., road grade, road surface conditions, or wind load. The operating mode may be predicated on a powertrain torque demand caused by a control module command to operate of the electrical machines in an electrical energy generating mode or in a torque generating mode. The operating mode can be determined by an optimization algorithm or routine operable to determine optimum system efficiency based upon operator demand for power, battery state of charge, and energy efficiencies of the engine 14 and MG-A and MG-B 56, 72. The control system, manages torque inputs from the engine 14 and MG-A and MG-B 56, 72 based upon an outcome of the executed optimization routine, and system optimization occurs to optimize system efficiencies to improve fuel economy and manage battery charging. Furthermore, operation can be determined based upon a fault in a component, or system.

Figure 4:
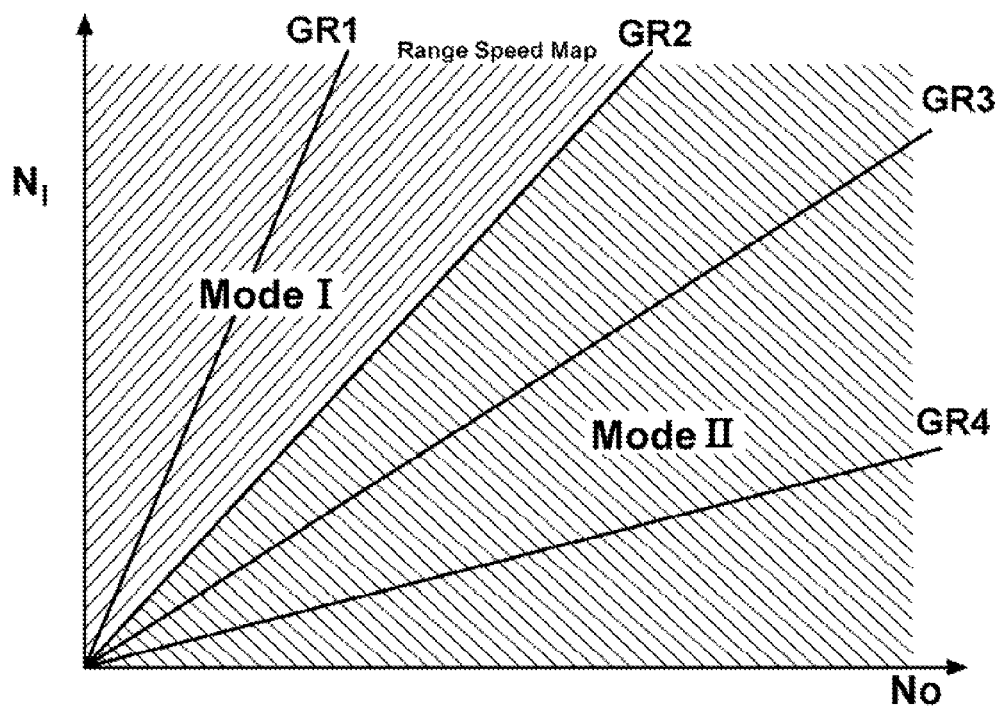
FIG. 4 is a graphical depiction, in accordance with the present invention.

Referring now to FIG. 4, various transmission operating modes are plotted as a function of transmission output speed, $N_O$, and transmission input speed, $N_I$ for the exemplary transmission and control system shown in FIGS. 1 and 2. The Fixed Ratio operation is shown as individual lines for each of the specific gear ratios, GR1, GR2, GR3, and GR4, as described with reference to Table 1, above. The continuously variable Mode operation is shown as ranges of operation for each of Mode I and Mode II. The transmission operating mode is switched between Fixed Ratio operation and continuously variable Mode operation by activating or deactivating specific clutches. The control system is operative to determine a specific transmission operating mode based upon various criteria, using algorithms and calibrations executed by the control system, and is outside the scope of this invention. Selection of the mode of operation of the transmission depends primarily on operator input and the ability of the powertrain to meet that input.

Referring to Tables 1 and 2 and again to FIG. 4, the low range operating state includes selective actuation of clutches C2, C1, and C4, facilitating operation in any one of continuously variable Mode I, and fixed gears GR1, GR2, and GR3.

The high range operating state includes selective actuation of clutches C2, C3, and C4, facilitating operation in any one of continuously variable Mode II and fixed gears GR3 and GR4. It should be recognized that ranges of continuously variable operation for Mode I and Mode II may overlap.

In operation, a shift occurs in the exemplary transmission due to a variety of operating characteristics of the powertrain. There may be a change in demand for an operator demand for torque. Such demands are typically communicated through inputs to the UI 13 as previously described. Additionally, a change in demand for output torque may be predicated on a change in external conditions, including, e.g., changes in road grade, road surface conditions, or wind load. A shift change may be predicated on a change in powertrain torque demand caused by a control module command to change one of the electrical machines between electrical energy generating mode and torque generating mode. A shift change may be predicated on a change in an optimization algorithm or routine operable to determine optimum system efficiency based upon operator demand for power, battery state of charge, and energy efficiencies of the engine 14 and MG-A and MG-B 56, 72, The control system manages torque inputs from the engine 14 and MG-A and MG-B 56, 72 based upon an outcome of the executed optimization routine, and there can be changes in system optimization that compel a shift change in order to optimize system efficiencies to improve fuel economy and manage battery charging. Furthermore, a shift change may be predicated upon a fault in a component or system. The distributed control module architecture acts in concert to determine a need for a change in the transmission operating mode, and executes the forgoing to effect the change in transmission operation. A shift change in the exemplary system comprises one of at least three possible situations. There can be a shift from one fixed gear to a second fixed gear. There can be a shift from a fixed gear to one of the continuously variable modes. There can be a shift from one of the continuously variable modes to a fixed gear.

Referring now to the transmission described with reference to FIGS. 1, 2, 3, and 4, and Tables 1 and 2, specific aspects of the transmission and control system are described herein. The control system selectively actuates the pressure control devices and the flow management valves based upon a demand for torque, presence of a fault, and temperatures of the electric motors. The control system selectively commands one of the low-range continuously variable operation, the high-range continuously variable operation, the low range state, and the high range state based upon selective actuation of the X-valve 118 and Y-valve 120 flow management valves. The control system effects actuation of the stator cooling system for MG_A (MG_A Stator Cool), the stator cooling system for the second electrical machine (MG_B Stator Cool), and the first hydraulically-actuated clutch (C1) based upon selective actuation of the pressure control devices PCS_2, PCS_3, and PCS_4 when the low-range continuously variable operation has been commanded. Furthermore, the control system is operative to effect actuation of the stator cooling system for MG-A, stator cooling system for MG-B, and the second hydraulically-actuated clutch (C2) based upon selective actuation of the pressure control devices when the high-range continuously variable operation has been commanded. The control system is operative to effect actuation of the first, second, and fourth hydraulically-actuated clutches (C1, C2, C4) based upon selective actuation of the pressure control devices when the low-range state has been commanded, comprising operation in one of the first, second, and third fixed gear ratios via selective actuation of the clutches. The control system is operative to effect actuation of the second, third, and fourth hydraulically-actuated clutches (C2, C3, C4) based upon selective actuation of the pressure control devices when the high-range state has been commanded, comprising operation in one of the third and fourth fixed gear ratios via selective actuation of the clutches.

As previously stated, fluid output from each of the second, third and fourth pressure control, devices (PCS_2, PCS_3, and PCS_4) is selectively mapped to one of the four hydraulically-actuated clutches and stator cooling systems for MG_A and MG_B based upon commanded positions of the first and second flow management valves. Therefore, selective actuation of PCS_2 effects flow of hydraulic fluid to provide cooling to the stator of MG-B, when both the X-valve and the Y-valve are commanded to Low. Selective actuation of PCS_2 effects flow of hydraulic fluid to actuate clutch C2 when either of the X-valve and the Y-valve are commanded to High. Selective actuation of PCS_3 effects flow of hydraulic fluid to actuate clutch C1 when both the X-valve and the Y-valve are commanded to Low. Selective actuation of PCS_3 effects flow of hydraulic fluid to provide cooling to the stator of MG-B when the X-valve is commanded to Low and the Y-valve is commanded to High. Selective actuation of PCS_3 effects flow of hydraulic fluid to actuate clutch C1 when the X-valve is commanded to High and the Y-valve is commanded to Low. Selective actuation of PCS_3 effects flow of hydraulic fluid to actuate clutch C3 when both the X-valve and the Y-valve are commanded to High. Selective actuation of PCS_4 effects flow of hydraulic fluid to provide cooling to the stator of MG-A when the X-valve is commanded to Low, regardless of the position to which the Y-valve is commanded. Selective actuation of PCS_4 effects flow of hydraulic fluid to actuate clutch C4 when the X-valve is commanded to High, regardless of the position to which the Y-valve is commanded.

Figure 5:
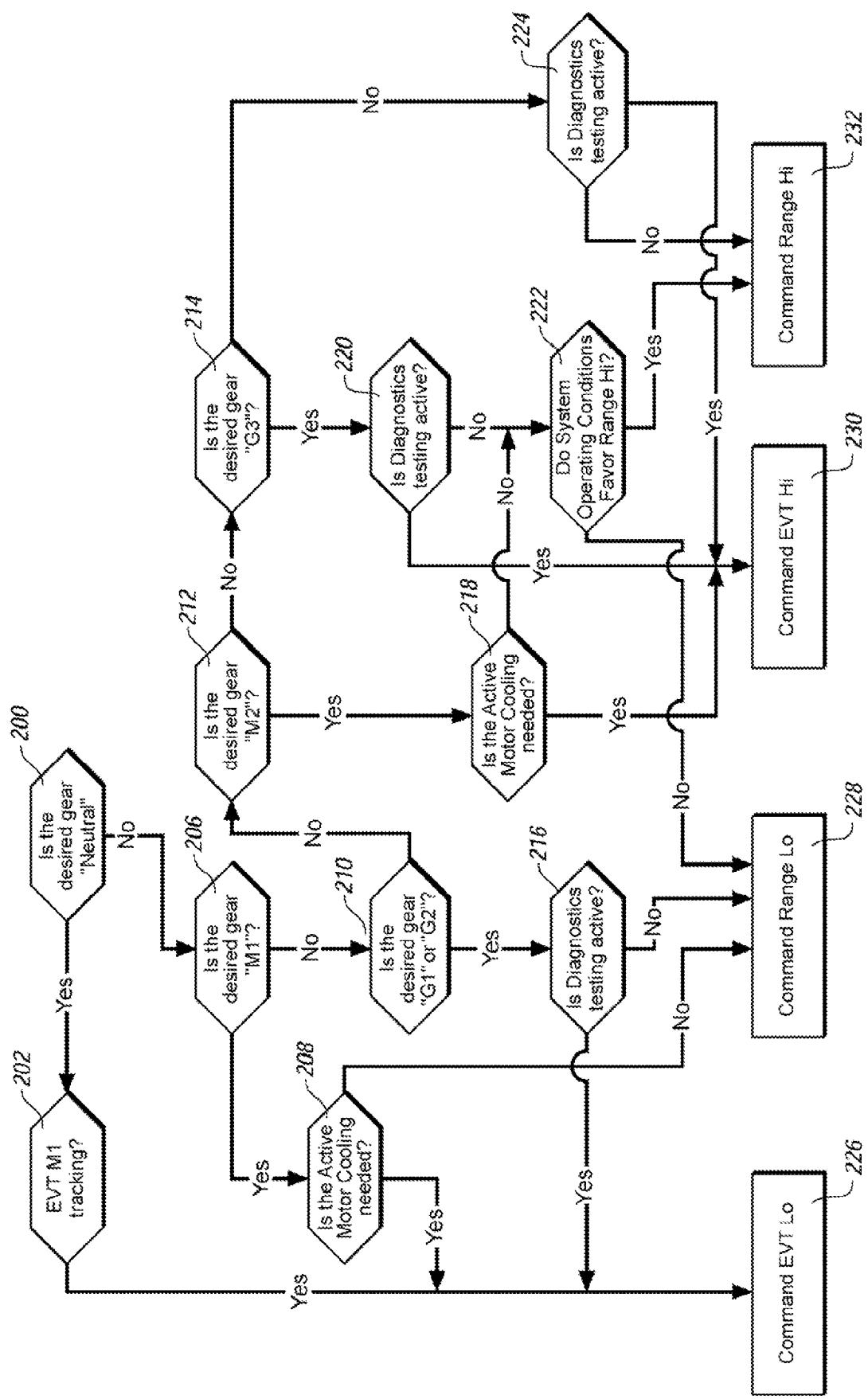
FIGS. 5 and 6 are logic flowcharts, in accordance with present invention; and, FIG. 7 is a graphical depiction, in accordance with the present invention.

Referring now to the flowchart shown in FIG. 5, with reference to the exemplary transmission described with reference to FIGS. 1, 2, 3, and 4, and Tables 1 and 2, specific aspects of controlling operation of the exemplary transmission and control system are described, comprising a control scheme for selectively commanding one of the low-range continuously variable operation, the high-range continuously variable operation, the low range state, and the high range state based upon selective actuation of the flow management valves, i.e. the X-valve and the Y-valve. A desired operating state, i.e. fixed gear or continuously variable mode operation, is determined for the exemplary transmission based upon the operating characteristics of the powertrain. When the desired gear is neutral (Block 200), and EVT Mode I is tracking (Block 202), then continuously variable Mode I is commanded (Block 226), resulting in both X-valve and Y-valve commanded to Low. When the desired gear is not neutral, the control scheme determines what the desired operating state comprises, i.e. Mode I, Mode II, GR1, GR2, or GR3. When the desired gear is Mode I (Block 206), the control scheme determines when active stator cooling has been commanded (Block 208). When stator cooling has been commanded, then continuously variable Mode I is commanded (Block 226). When stator cooling has not been commanded, then the Low Range is commanded (Block 228), resulting in X-valve commanded to High and Y-valve commanded to Low. When the desired gear is either of GR1 and GR2 (Block 210), it is determined whether diagnostic testing is occurring (Block 216). When diagnostic testing is occurring, then continuously variable Mode I is commanded (Block 226). When diagnostic testing is not occurring, then the Low Range is commanded (Block 228). When the desired operating state is Mode II (Block 212), it is determined whether stator cooling has been commanded (Block 218), resulting in continuously variable Mode II being commanded (Block 230), resulting in X-valve commanded to Low and Y-valve commanded to High. When stator cooling has not been commanded, it is determined whether system operating conditions favor operating in the high range (Block 222), and the controlled output is commanded the High Range (Block 232) or to the Low Range (Block 228) accordingly. When the High Range is commanded (Block 232), the X-valve commanded to High and Y-valve commanded to High. When the desired operating state is GR3, then it is determined whether diagnostic testing is occurring (Block 220). When diagnostic testing is occurring, then continuously variable Mode II is commanded (Block 230). When diagnostic testing is not occurring, then it is determined whether system operating conditions favor operating in the high range (Block 222), and the controlled output is commanded the High Range (Block 232) or to the Low Range (Block 228) accordingly.

The diagnostic testing referenced hereinabove preferably includes active fault testing wherein one or more of the pressure control solenoid devices is selectively actuated during ongoing operation to determine whether it is functioning properly.

Figure 6:
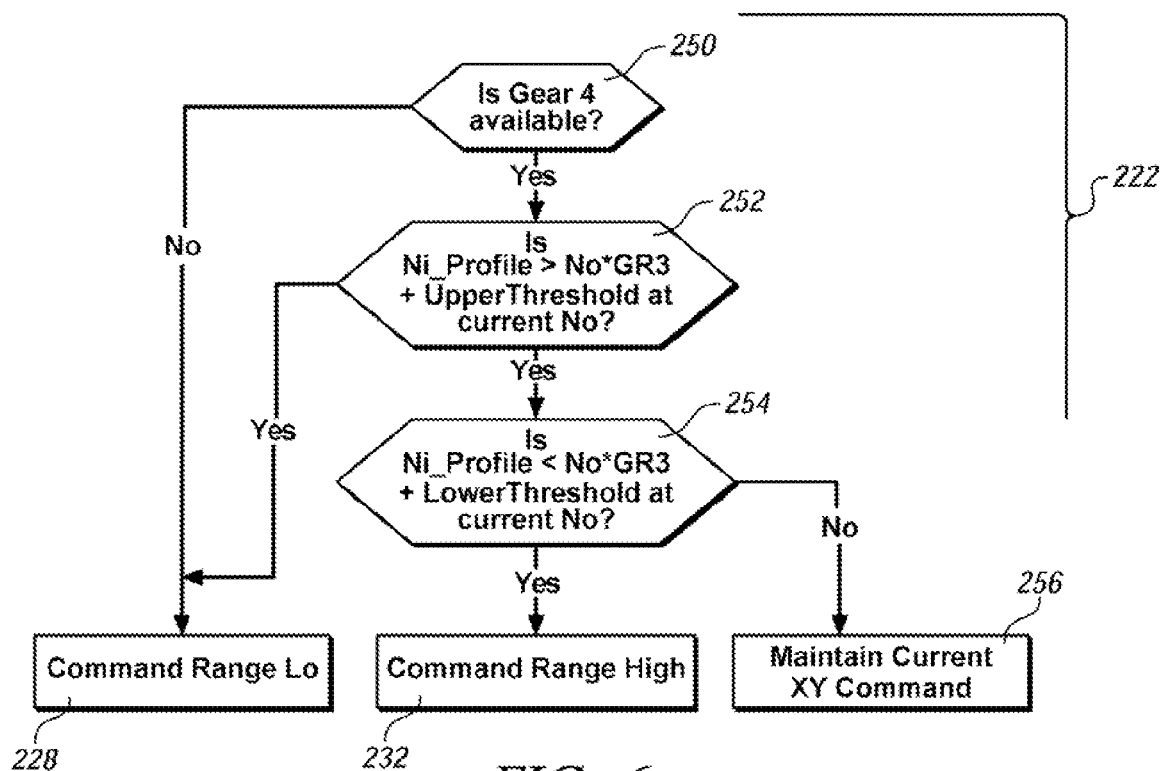
Figure 7:
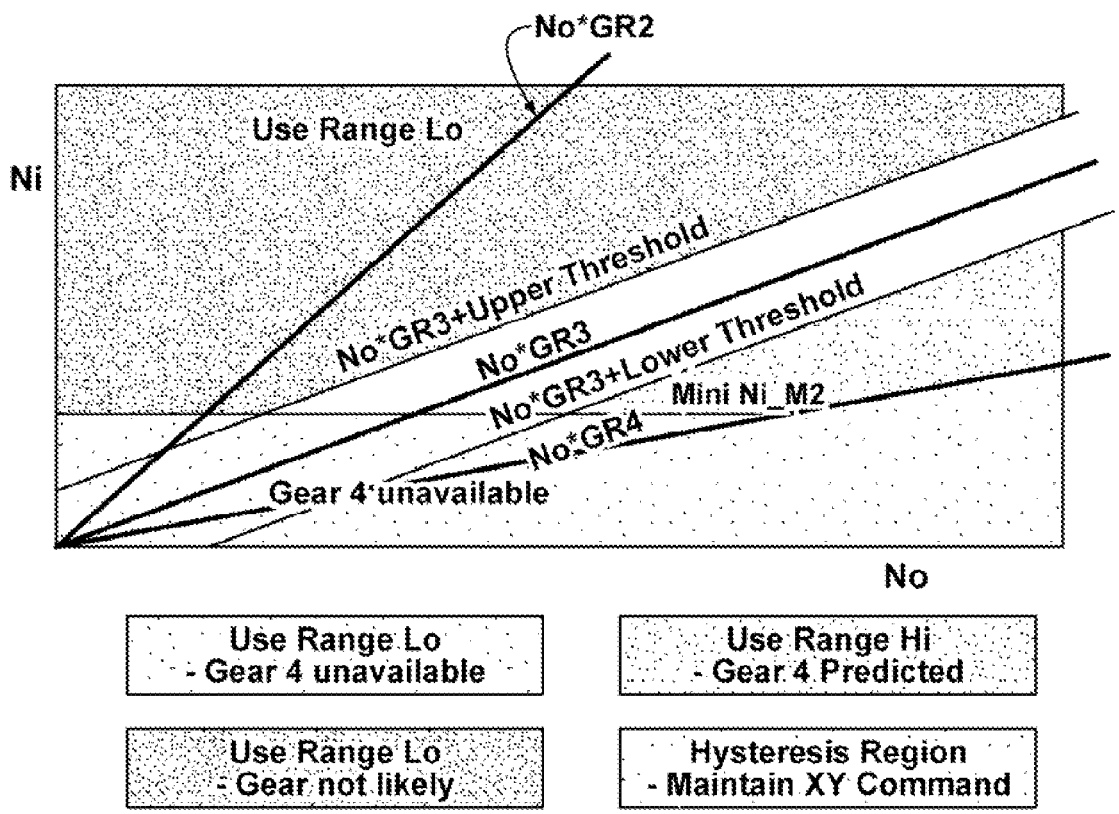

Referring now to the flowchart in FIG. 6 and the graph in FIG. 7, determining whether system operating conditions favor operating in the high range (Block 222) is described in greater detail. It is first determined whether GR-4 is available (Block 250), based upon $N_I$ and $N_O$, as shown graphically in FIG. 7, the values of which are precalibrated and storage in ROM in the control system. When GR4 is not available, the Low Range is commanded (Block 228). When GR4 is available, then it is determined whether a predicted time-rate change in input speed, $N_{I\_}$profile is greater than $N_O\_GR3$ plus a hysteresis threshold, preferably of about 100 engine rpm (Block 252), again resulting in the Low Range being commanded (Block 228). It is then determined whether time-rate change in input speed, $N_{I\_}$profile is less than. $N_O\_GR3$ minus a hysteresis threshold, preferably of about 100 engine rpm (Block 254). When the time-rate change in input speed, $N_{I\_}$profile is less than $N_O\_GR3$ minus the hysteresis threshold, then operation in the High Range is commanded (Block 232). When the time-rate change in input speed, $N_{I\_}$profile greater less than $N_O\_GR3$ minus the hysteresis threshold, then the current command for the X and Y valves is maintained (Block 234).

The control system is operative to determine presence of a fault based upon a selective transition of the first flow management valve between a commanded-on state and a commanded-off state. The control system is operative to monitor signal outputs from pressure monitoring devices PS1, PS2, PS3 and PS4. Therefore, the control system is operative to selectively command either one of the low-range continuously variable operation and the high-range continuously variable operation based upon selective actuation of the flow management valves when presence of a fault has been determined.

It is understood that modifications in the transmission hardware are allowable within the scope of the invention. The invention has teen described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Control system for electro-mechanical transmission selectively configured to operate in a plurality of fixed gear modes and continuously variable modes comprising first and second electrical machines and four hydraulically-actuated clutches in fluid communication with a hydraulic circuit comprising first, second and third pressure control devices and first and second flow management valves; the control system configured to selectively actuate the pressure control devices and the flow management valves based upon a demand for torque, presence of a fault, and temperatures of the electric machines, wherein fluid output from each of the first, second and third pressure control devices is selectively mapped to one of the four hydraulically-actuated clutches and stator cooling systems for the first and second electrical machines based upon commanded positions of the first and second flow management valves.

2. The control system of claim 1, wherein selective actuation of the second pressure control device effects flow of fluid to the stator cooling system for the second electrical machine when the first flow management valve is commanded off and the second flow management valve is commanded on.

3. The control system of claim 1, wherein selective actuation of the second pressure control device effects actuation of the first hydraulically-actuated clutch when the first flow management valve is commanded on and the second flow management valve is commanded off.

4. The control system of claim 1, wherein selective actuation of the second pressure control device effects actuation of the third hydraulically-actuated clutch when the first flow management valve is commanded on and the second flow management valve is commanded on.

5. The control system of claim 1, wherein selective actuation of the first pressure control device effects actuation of the second hydraulically-actuated clutch when either of the first and second flow management valves are commanded on.

6. The control system of claim 1, wherein selective actuation of the second pressure control device effects actuation of the third hydraulically-actuated clutch only when the first and the second flow management valves are commanded on.

7. The control system of claim 1, wherein selective actuation of the third pressure control device effects actuation of the fourth hydraulically-actuated clutch when the first flow management valve is commanded on.

8. The control system of claim 1, wherein selective actuation of the fourth pressure control device effects flow of fluid to the stator cooling system for the first electrical machine when the first flow management valve is commanded off.

9. The control system of claim 1, wherein selective actuation of the first pressure control device effects flow of fluid to the stator cooling system for the second electrical machine when the first flow management valve is commanded off and the second flow management valve is commanded off.

10. The control system of claim 1, wherein the control system is configured to determine presence of a fault based upon a selective transition of the first flow management valve between a commanded-on state and a commanded-off state.

11. The control system of claim 10, wherein the control system configured to determine the presence of the fault comprises the control system configured to monitor outputs from a plurality of pressure monitoring devices configured to monitor the hydraulic circuit.

12. The control system of claim 11, wherein the control system is configured to selectively command one of a low-range continuously variable operation and a high-range continuously variable operation based upon selective actuation of the flow management valves when presence of the fault has been determined.

13. The control system of claim 1, further comprising the control system configured to selectively command one of a low-range continuously variable operation, a high-range continuously variable operation, a low range state, and a high range state based upon selective actuation of the flow management valves.

14. The control system of claim 13, wherein the control system is configured to selectively command the high range state based upon an input speed profile and an output speed.

15. The control system of claim 13, further comprising the control system configured to effect actuation of the stator cooling system for the first electrical machine, stator cooling system for the second electrical machine, and the first hydraulically-actuated clutch based upon selective actuation of the pressure control devices when the low-range continuously variable operation has been commanded.

16. The control system of claim 13, further comprising the control system configured to effect actuation of the stator cooling system for the first electrical machine, stator cooling system for the second electrical machine, and the second hydraulically-actuated clutch based upon selective actuation of the pressure control devices when the high-range continuously variable operation has been commanded.

17. The control system of claim 13, wherein the control system configured to selectively actuate the pressure control devices and the flow management valves based upon a demand for torque comprises the control system configured to monitor an operator demand for torque, external operating conditions, a state of charge of a electrical energy storage device, and operating efficiencies of an operatively attached engine.

18. The control system of claim 13, wherein the control system configured to selectively actuate the pressure control devices and the flow management valves based upon temperatures of the electric machines comprises the control system configured to monitor stator temperatures of each of the electrical machines and configured to effect machine cooling based thereupon.

19. The control system of claim 13, further comprising the control system configured to effect actuation of the second, third, and fourth hydraulically-actuated clutches based upon selective actuation of the pressure control devices when the high-range state has been commanded.

20. The control system of claim 19, further comprising the control system configured to operate in one of a third and a fourth fixed gear ratio via selective actuation of the clutches.

21. The control system of claim 13, further comprising the control system configured to effect actuation of the first, second, and fourth hydraulically-actuated clutches based upon selective actuation of the pressure control devices when the low-range state has been commanded.

22. The control system of claim 21, further comprising the control system configured to operate in one of a first, a second, and a third fixed gear ratio via selective actuation of the clutches.

23. Method for controlling an electro-mechanical transmission configured to selectively operate in one of a plurality of fixed gear modes and continuously variable modes and comprising first and second electrical machines and four hydraulically-actuated clutches in fluid communication with a hydraulic circuit comprising first, second and third pressure control devices and first and second flow management valves; the method comprising:
  selectively actuating the pressure control devices and the flow management valves based upon a demand for torque, presence of a fault, and temperatures of the electric machines, and
  selectively mapping fluid output from each of the first, second and third pressure control devices to one of the four hydraulically-actuated clutches and stator cooling systems for the first and second electrical machines based upon commanded positions of the first and second flow management valves.

24. Transmission, comprising: an electro-mechanical device configured to transmit torque, comprising:
  first and second electrical machines;
  a plurality of planetary gears and four hydraulically actuated torque-transfer devices selectively actuatable using a hydraulic circuit;
  the hydraulic circuit comprising first, second and third pressure control devices and first and second flow management valves and pressure monitoring devices;
  a control system:
  adapted to monitor the pressure monitoring devices to identify presence of a fault;
  adapted to determine a demand for torque and temperatures of the electrical machines;
  adapted to execute a computer program to selectively actuate the four torque-transfer devices by selectively actuating the plurality of pressure control devices and flow management valves based upon the demand for torque, the presence of the fault, and the temperatures of the electrical machines.

25. The transmission of claim 24, further comprising the control system configured to selectively map fluid output from each of the first, second and third pressure control devices to one of the four hydraulically-actuated clutches and stator cooling systems for the first and second electrical machines based upon commanded positions of the first and second flow management valves.

26. The transmission of claim 25, wherein the control system is configured to selectively actuate the four torque-transfer clutches to effect operation in one of the plurality of operating modes comprising four fixed gear ratio modes and two continuously variable modes.

27. Control system for hydraulic circuit for an electro-mechanical transmission comprising a plurality of planetary gears, a pair of electric machines and a plurality of torque-transfer devices and configured to selectively operate in one of a plurality of fixed gear modes and continuously variable modes, comprising:
  the hydraulic circuit configured to selectively control flow of pressurized fluid to the plurality of torque-transfer clutches and cooling circuits for the pair of electric machines;
  the hydraulic circuit comprising a hydraulic pump in fluid communication with three selectively actuatable pressure control solenoids in fluid communication with two selectively controllable flow control valves in fluid communication with the plurality of torque-transfer clutches and the cooling circuits for the pair of electric machines;
  the control system configured to selectively actuate the pressure control solenoids and the flow control valves based upon a demand for torque output, presence of a fault, and temperature of the electric machine;
  wherein fluid output from the three selectively actuatable pressure control solenoids is selectively mapped to one of the plurality of torque-transfer devices and the cooling circuits for the pair of electric machines based upon commanded positions of the first and second flow control valves.

* * * * *